3,658,754
SELF-EXTINGUISHING, COLOURED
MOULDED ARTICLES
Herbert Jenkner, Deutz-Kalker, Str. 66, Cologne-Deutz, Germany, and Hans-Eberhard Praetzel, An der Lenzwiese 19, Cologne-Gremberg, Germany
No Drawing. Filed Mar. 20, 1970, Ser. No. 21,505
Claims priority, application Germany, Mar. 22, 1969,
P 19 14 644.2
Int. Cl. C08f 47/04; C09k 3/28
U.S. Cl. 260—45.7 R
8 Claims

ABSTRACT OF THE DISCLOSURE

The use of brominated quinones as flameproofing components for homopolymers of styrene or alpha-methylstyrene or for copolymers, the major part of which consist of styrene and/or alpha-methylstyrene.

---

For many purposes in the building trade and particularly in electrical engineering, articles moulded from polymers of styrene are required, which are self-extinguishing after removal from an outside flame.

It is known that moulded articles may be rendered self-extinguishing by admixing organic, halogen-containing compounds to the polystyrene moulding compositions. The known processes, however, have various disadvantages. It is desirable that only small amounts of halogen-containing compounds are present in the articles moulded from polystyrene, thus avoiding that their mechanical and physical properties are adversely affected. The incorporation of larger amounts of organic halogen-containing compounds (about over 12%) is always accompanied by an undesirable plastification of the moulded articles. Articles made from polystyrene foam may be rendered flameproof by adding from 0.5 to 5% by weight of bromine compounds as, for example, hexabromocyclododecane. This is impossible, however, with articles moulded from solid polystyrene. Articles made from polystyrene foam have, during combustion, a low heat capacity only, since the foam body melts down during combustion. Consequently, small amounts of flameproofing components are sufficient, in spite of the large surface of the foam, to quench the burning of a foam body after the removal from the flame. Owing to the large quantity of material, overheating will occur in articles moulded from solid polystyrene, so that the burning can be brought to an end only if larger amounts of flameproofing components as, e.g. from 10 to 20% by weight of pentabromodiphenylether are incorporated. Disadvantageous effects on the properties of the articles moulded from polystyrene are inevitable, however, if such large amounts of flameproofing components are added.

Processes are already known, however, according to which a sufficient flame-resistance may be obtained, even if smaller amounts of flameproofing components are incorporated. In the DAS 1,255,302 a process is described, according to which foamed and also solid polystyrene may be flameproofed admixing preferably from 0.5 to 3% by weight of organic bromine compounds which contain at least 4 carbon atoms and 40% by weight of bromine as, for instance, tetrabromobutane, dibromoethylbenzene, hexabromobenzene, tris - (dibromopropyl) - phosphate, pentabromodiphenylether, hexabromocyclododecane and octabromohexadecane. This process, however, requires the addition of a synergist to the polystyrene. Polymers, having following general formula, are used as synergists:

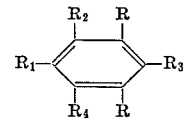

in which the substituents $R_1$, $R_2$, $R_3$ and $R_4$ represent the group $$R-CH-R$$

the remaining R's representing hydrogen, halogen or an alkyl group.

The manufacture of these synergists, however, requires additional technical steps. Similar processes, requiring in each case other synergists, are described in the DAS 1,244,395, 1,245,593, 1,260,136, 1,282,939, in U.S. Pat. 3,338,864, in French Pats. 1,410,556, 1,472,788 and in the Belgian Pat. 645,846. According to these patents hydrazine derivatives, metal salts of a metal pertaining to the IVth or Vth main group or to the Ist to VIIIth auxiliary group of the periodic system and an organic acid, organic silanes, peroxy compounds, phosphine oxides and sulfonamides are used as synergists. As can be seen by the great number of processes, none of the synergists seems to have come up to the expectations in a really satisfactory way, not justifying, after all, the additional technical steps necessary to manufacture the synergists.

In accordance with another process, described in U.S. Pat. 2,676,946, polystyrene may be rendered flameproof by admixing from 3 to 10% by weight of a polybrominated alkyl aromatic hydrocarbon, containing several bromine atoms in the side chain and 8 to 10 carbon atoms in the molecule. These bromine compounds, however, decompose at the temperature at which the polystyrene is moulded, causing thereby a corrosive action on the moulding apparatus, irritations of the mucous membranes of the people working at the moulding apparatus as well as brownish tints in the polystyrene. To reduce these effects a stabiliser for the bromine compound must be added. Such a stabiliser, however, will provide insufficient protection only against the aforementioned effects. According to Canadian Pat. 664,710 and U.S. Pat. 3,061,584 polystyrene may be flameproofed by incorporating from 0.1 to 5% by weight of poly bromocyclohexane, hydrocarbontetrabromide, tetrabromobutane or styrene dibromide. These flameproofing components, however, do not impart reliable flame resistance, as these polybromo-compounds tend to decompose spontaneously which, in addition, causes the discolouration of the polystyrene upon exposure to light. Consequently, UV-stabilisers are to be added which, however, can only prevent the discolouration of the polystyrene, but not the decomposition of the flameproofing components. To reduce the corrosive action on the moulding apparatus it is also necessary, in accordance with U.S. Pat. 3,324,076, to incorporate a corrosion inhibitor, if these bromine compounds are used as flameproofing components. Accordingly, the latter processes can also not be regarded as contributing a technically satisfactory solution to the problem to be solved.

Furthermore, attention is also called to the process described in U.S Pat. 3,372,141, according to which, articles moulded from polystyrene may be rendered flameproof by introducing from 0.1 to 5% by weight of an ether from 2,3,3-tribromo-allylalcohol and a brominated phenol. The manufacture of these flameproofing components, however, from a technical point of view, is rather costly and complex. 1,1,2,3-tetrabromo-propen-1, difficult to manufacture, must be etherified with phenol which, must be brominated beforehand. During etherification, however, one of the bromine atoms, introduced before, is split off and, consequently, can no longer contribute to the flameproofing effect of the components.

Attempts have therefore been made to find means which would make it possible, in a simple technical way, to flameproof especially solid polystyrene, without that the physical and mechanical properties of the polystyrene are adversely affected.

This invention relates to the use of brominated quinones as flameproofing components for homopolymers of styrene or alpha-methylstyrene or for copolymers, the greater part of them consisting of styrene and/or alpha-methylstyrene.

This invention pertains particularly to self-extinguishing, coloured articles moulded from homo- or copolymers of styrene or alpha-methylstyrene, containing at least 50% by weight of styrene or alpha-methylstyrene, and comprising organic bromine compounds as flameproofing components which are characterized by the fact that they contain, as flameproofing components, from 0.2 to 5% by weight, preferably from 0.8 to 3% by weight of brominated quinones.

According to the invention, polystyrene, poly-alpha-methylstyrene, copolymers of styrene and alpha-methylstyrene may be rendered self-extinguishing by introducing, for example, acrylonitrile, esters of acrylic or methacrylic acid, butadiene, acrylonitrile and butadiene, diphenylbenzene, and their compounds. In order to simplify the description these compounds and their polymers will hereinafter be referred to as "styrene" and "polystyrene."

o- or p-dibromoquinone, o- or p-tetrabromoquinone as well as the mixtures of various stages of bromination of o- or p-quinones are used as brominated quinones. The brominated quinones are manufactured by known processes.

To manufacture p-tetrabromoquinone—to cite an example—400 gms. of tetrabromohydroquinone are incorporated—whilst stirring—into 1,900 gms. of nitric acid containing 65% by weight of $HNO_3$. Stir the reaction mixture continuously whilst keeping it for 5 hours at a temperature of 50° C. Allow to cool to room-temperature. Then the resultant precipitate is filtered off and is washed with water until the washing water's reaction is neutral. After the drying of the precipitate at 60° C. and under a pressure of 10 torr, 387 gms. of p-tetrabromoquinone are obtained.

To manufacture o-tetrabromoquinone 130 gms. of tetrabromocatechol are dissolved in 120 gms. of ethylalcohol. Allow this solution to cool to a temperature of 5° C. and then admix—whilst stirring—a mixture of 33.5 gms. nitric acid containing 65% by weight of $HNO_3$, and 210 gms. of acetic acid. Ten minutes afterwards the precipitated o-tetrabromoquinone is filtered off and is washed with water until the water's reaction is neutral. After drying the precipitate at 80° C. a quantity of 76 gms. of o-tetrabromoquinone are obtained.

As the brominated quinones are coloured, they impart to the polystyrene flameproofed thereby a characteristic yellow to yellow-orange colour whereby the transparency of the polystyrene is not impaired and additions of other dye-stuffs (green, blue, red, yellow) have no disadvantageous effect.

From 0.2 to 5% by weight, preferably from 0.8 to 3% by weight of brominated quinones are incorporated into the polystyrene moulding compositions before or after polymerisation. It is also possible to add more than 5% by weight of brominated quinones, but this is not necessary to obtain the flame-resistance required.

The brominated quinones may be added to the liquid monomer or partly polymerised styrene. A solution of polystyrene in monomer styrene may be used in place of the partly polymerised styrene. Other additives as, e.g., plasticizers, fillers, lubricants, UV-stabilisers, dye-stuffs and, if necessary, also further flameproofing components may be worked into these mixtures. After the incorporation of polymerisation catalysts as for example, azeocompounds, the mixtures are then polymerised at temperatures from 60 to 120° C., employing known processes. Depending upon conditions chosen, suspension-, emulsion- or block-polymers will form.

The brominated quinones, however, may also be admixed to the already polymerised styrene. To manufacture articles moulded from solid polystyrene, the latter, usually available in the form of granules is mixed with the brominated quinone in thermoplastic condition at temperatures from 120 to 160° C., e.g. on rolls, in an extruder or in a kneader.

At temperatures at which polystyrene compositions are moulded, the brominated quinones, used as flameproofing components, in accordance with the invention, are chemically and thermally completely stable so that no signs of decomposition whatsoever will appear. The addition of stabilizers and corrosion inhibitors is therefore not necessary. The brominated quinones are also physiologically harmless as they are odourless and do not cause skin irritation. Owing to their stability the brominated quinones, used to flameproof articles moulded from polystyrene, will impart to these articles a permanent flame-protection which, if the moulded article is exposed to a flame, will quench the burning article immediately after the removal from the flame.

Since even small amounts of brominated quinones are sufficient to impart such flame-resistance to articles moulded from polystyrene, the mechanical and physical properties of the latter will virtually not be altered, as compared with articles moulded from equal, but not flameproofed compositions. During storage the brominated quinones do not exude out of the articles moulded from polystyrene, neither at room-temperature, nor at 60° C. Accordingly, moulded articles, manufactured in accordance with the invention, have excellent resistance to flames, to heat and light, making it possible to use them for all technical purposes.

Examples are cited hereunder for articles moulded from polystyrene according to the invention. The flame-resistance of the moulded articles is determined in accordance with the method ASTM D 635–56 T. Test sticks, measuring 13 x 6.5 x 127 mm., are cut from the moulded article to be tested. One end of the test stick is fastened—in a horizontal position—in a tripod-clamp so that the narrow side of the largest of the lateral surfaces forms, with the horizontal line, an angle of 45°. Underneath that test stick, at a distance of 9.6 mm.—also held in place by a clamp—a Bunsen-burner metal gauze, 116 mm. in length (about 10.3 cm.$^2$ and 58 mesh per cm.$^2$) is fastened. For the burning test the free end of the test stick is heated in a non-luminous Bunsen-flame for 30 seconds. If the test stick does not continue burning at all, the classification will be: "not burning according to this test." If the material goes on burning, after the removal of the flame—without crossing the mark at 10 cms.—it is classified as "self-extinguishing," according to this test. If the material continues burning it is classified as "burning according to this test."

Moreover, the following test is employed for testing the sticks:

Test sticks, measuring 300 x 50 x 4 mm., are prepared. The sticks are hung up in a vertical position and their lower edge is heated in a Bunsen-burner flame, about 2–3 cm. in length, until the lower edge starts burning. The flame is removed and the time is measured the material continues burning after the removal of the flame. The ignition is repeated 3 to 4 times on each stick.

To manufacture moulded articles in accordance with the invention, the amounts of brominated quinones, quoted in the table, are incorporated into 150 parts by weight of granulated blockstyrene, using rolls. Then the panels are pressed. Rolling and pressing are carried out at 150° C.

TABLE

| Test stick No. | Parts by weight of p-tetra-bromo-quinone | Test ASTM D 635-56 T | Time,[1] seconds |
|---|---|---|---|
| 1 | 15 | Tested 6 times not burning | 0,0,0,0 |
| 2 | 12 | ...do... | 0,1,0 |
| 3 | 10.5 | Tested 8 times not burning | 0,0,0 |
| 4 | 6 | ...do... | 0,0,0,0 |
| 5 | 3 | ...do... | 1,0,0 |
| 6 | 2 | Tested 6 times self-extinguishing | 5,2,2 |
| 7 | 1.5 | ...do... | 10,20,5,20 |
| 8 | 1.12 | ...do... | 16,26,4,21 |
| | p-Dibromo-quinone | | |
| 9 | 9 | Tested 8 times not burning | 1,1,1,1 |
| 10 | 6 | ...do... | 1,1,1,0 |
| 11 | 3 | ...do... | 2,4,2,8 |
| | p-Tribromo-quinone | | |
| 12 | 9 | ...do... | 1,0,1,0 |
| 13 | 6 | ...do... | 0,1,1,0 |
| 14 | 3 | ...do... | 2,1,1,3 |
| 15 | 1.5 | ...do... | 2,1,1,3 |
| 16 | 3 | Tested 8 times self-extinguishing | 25,>90 |
| 17 | 6 | ...do... | 1,1 |
| 18 | 7.5 | Tested 8 times not burning | 1,0 |
| 19 | 9 | ...do... | 1,2 |

[1] The material continued burning after the removal from the flame

What is claimed is:

1. Self-extinguishing moulded articles of a polymer selected from the group consisting of homopolymers of styrene, homopolymers of alpha-methylstyrene, copolymers the major part of which consists of styrene, and copolymers the major part of which consists of alpha-methylstyrene, said polymers containing a flame-retarding amount of brominated quinones.

2. Self-extinguishing, coloured articles moulded from homo- or copolymers of styrene or alpha-methylstyrene, containing at least 50% by weight of styrene or alpha-methylstyrene, comprising organic bromine compounds as flameproofing components, characterized by the fact that they contain from 0.2 to 5% by weight, of brominated quinones as flameproofing components.

3. The articles of claim 2 characterized by the fact that they contain from 0.8 to 3% by weight of brominated quinones as flameproofing components.

4. Self-extinguishing moulded articles, according to claim 1, characterized by the fact that they contain p-dibromoquinones as flameproofing component.

5. Self-extinguishing moulded articles, according to claim 1, characterized by the fact that they contain o-dibromoquinone as flameproofing component.

6. Self-extinguishing moulded articles, according to claim 1, characterized by the fact that they contain p-tetrabromoquinone as flame-proofing component.

7. Self-extinguishing moulded articles, according to claim 1, characterized by the fact that they contain o-tetrabromoquinone as flame-proofing component.

8. Self-extinguishing moulded articles, according to claim 1, characterized by the fact that they contain mixtures of various stages of bromination of the quinones, as flame-proofing component.

References Cited

UNITED STATES PATENTS

| | | | |
|---|---|---|---|
| 2,750,427 | 6/1956 | Gaertner | 260—623 |
| 2,676,927 | 4/1954 | McCurdy et al. | 260—2.5 |
| 3,093,599 | 6/1963 | Mueller-Tamm et al. | 260—2.5 |
| 3,479,373 | 11/1969 | Speziale et al. | 260—384 |
| 3,322,860 | 5/1967 | Mosby et al. | 260—893 |
| 2,472,112 | 6/1949 | Leatherman | 106—15 |

OTHER REFERENCES

Chem. Abs., vol. 45 (1951), p. 4089F, Breitenbach et al., "Copolymers of Styrene and Chloranil."

DONALD E. CZAJA, Primary Examiner

R. A. WHITE, Assistant Examiner

U.S. Cl. X.R.

106—15 FP; 252—8.1; 260—93.5 A